United States Patent

Halberg

[15] 3,656,573
[45] Apr. 18, 1972

[54] PLURAL OUTPUT PATH TORQUE TRANSMITTING MECHANISM WITH SLIP CLUTCH

[72] Inventor: Robert W. Halberg, Muncie, Ind.
[73] Assignee: Borg-Warner Corporation, Chicago, Ill.
[22] Filed: June 5, 1969
[21] Appl. No.: 830,752

[52] U.S. Cl. .......................... 180/44 R, 74/711, 180/24.09
[51] Int. Cl. .................................. B60k 17/34, B60k 17/20
[58] Field of Search .................. 180/44 R, 23, 24.09; 74/711, 74/710.5

[56] References Cited

UNITED STATES PATENTS

| 3,557,634 | 1/1971 | Bixby | 180/44 R X |
| 2,574,986 | 11/1951 | Schou | 180/23 UX |
| 3,264,901 | 8/1966 | Ferbitz et al. | 180/44 UX |
| 3,390,593 | 7/1968 | Brownyer | 180/44 UX |
| 3,400,777 | 9/1968 | Hill | 180/44 |
| 3,492,890 | 2/1970 | Hill et al. | 180/44 X |
| 3,557,634 | 1/1971 | Bixby | 180/44 X |

Primary Examiner—A. Harry Levy
Attorney—Donald W. Banner, Lyle S. Motley, C. G. Stallings and William S. McCurry

[57] ABSTRACT

A multiple path drive system for a vehicle having plural pairs of traction wheels including a torque transfer mechanism adapted to receive an input torque which incorporates a differential gear mechanism driven by the input torque and adapted to distribute the input torque to a plurality of drive axles and a friction clutch mechanism which acts to resist relative rotation between the drive axles.

5 Claims, 2 Drawing Figures

PATENTED APR 18 1972 3,656,573

INVENTOR
ROBERT W. HALBERG
BY Robert L. Ziey
ATTORNEY

PLURAL OUTPUT PATH TORQUE TRANSMITTING MECHANISM WITH SLIP CLUTCH

SUMMARY OF THE INVENTION

This invention relates to multiple path drive systems, for example, a four wheel drive system, and more particularly, to a system including a torque transfer mechanism adapted to receive an input torque from a prime mover and to transmit torque to a plurality of drive axles. The torque transfer mechanism includes a differential mechanism having a pair of output shafts each of which is adapted to be connected to a drive axle.

It is well recognized in the art that the tractive efforts of a vehicle are substantially improved if driving torque is applied to more than one drive axle. This concept underlies the employment of known four wheel drive systems in military vehicles or trucks intended for operation over unimproved terrain. However, certain prohibitive conditions and problems arise in the provision of known four wheel drive systems which have thus far precluded their employment in pneumatic tired commercial and passenger vehicles.

If all four wheels are positively driven by the engine, a severe amount of tire scraping or cornering scrub occurs as the vehicle negotiates curves or turns. Under such conditions, the front wheels must run through an arc of greater radius than that of the rear wheels, and therefore tend to rotate faster than the rear wheels. Further, in such a system, slight differences in effective wheel radii caused by inevitable differences in tire inflation, tread wear or variations in loading result in the occurrence of what is known as circumferential scrub. Under such conditions, the wheels having smaller radii necessarily tend to rotate faster than those having larger radii while traversing the same distance. If the wheels are positively driven together at the same angular speed by the drive system, then on corners the front wheels are bodily scraped over the ground, and on straight travel, the wheels having smaller radii are so scraped. Tires will not long withstand such abuse. In addition, undue stresses or windup occurs in the driving parts and fuel consumption is excessive.

One approach to solving the problems inherent in such a system is to provide a manually operable clutch or disengagable gear enabling the front wheels of the vehicle to be selectively engaged or disengaged for positive drive effort. Thus, the front wheels would only be locked into engagement for four wheel drive when surface conditions would permit. Such engagement would normally occur when the vehicle was traveling on unpaved surfaces. When the vehicle was traveling over paved surfaces, the front wheels would be disengaged and the standard rear wheel drive would propel the vehicle.

Much effort has been devoted to another approach which is providing a third differential in a four wheel drive system such that front and rear drive shafts would serve respectively to drive front and rear differentials, the shafts being powered from the engine through a center or third differential. Such a differential system clearly permits overspeeding of any one or more of the wheels as a result of rounding corners or of certain wheels having a smaller effective radius than others.

Certain problems however, arise in connection with this type of system. For instance, if one set of wheels should encounter a slippery or icy patch of ground and lose all traction, they will spin freely and the differential action will cause the other set of wheels to exert no driving torque. Manually operable locking means have been incorporated into such three differential systems which, when engaged, eliminate differential action between the drive shaft and positively lock the driven parts together. These are, however, inherently so limited in effectiveness that they have never found any commercial acceptance.

Other four wheel drive systems have been proposed which incorporate a center differential which will automatically provide for locking out or inhibiting differential action whenever limited free ranges of differential action are exceeded. Such devices are operative to automatically restore such action when the tendency to exceed the range ceases. One such system is shown and described in U.S. Pat. No. 2,796,941 issued to Claude Hill.

As will be apparent, however, such a system requires the addition of many structural elements and results in a mechanism which is both costly and cumbersome.

The present invention is directed to providing a torque transfer mechanism which will provide a predetermined resistance to differentiation between the drive axles which may be overcome when differential action is desired. Such a result is accomplished by providing a clutch between certain elements of the differential which is biased to the engaged condition by a predetermined force. This invention is adapted to provide such a result with the addition of a minimum number of operating parts and is further adapted to provide such a result in a most economical manner.

DESCRIPTION OF THE PREFERRED EMBODIMENT

Figures 1, 2:
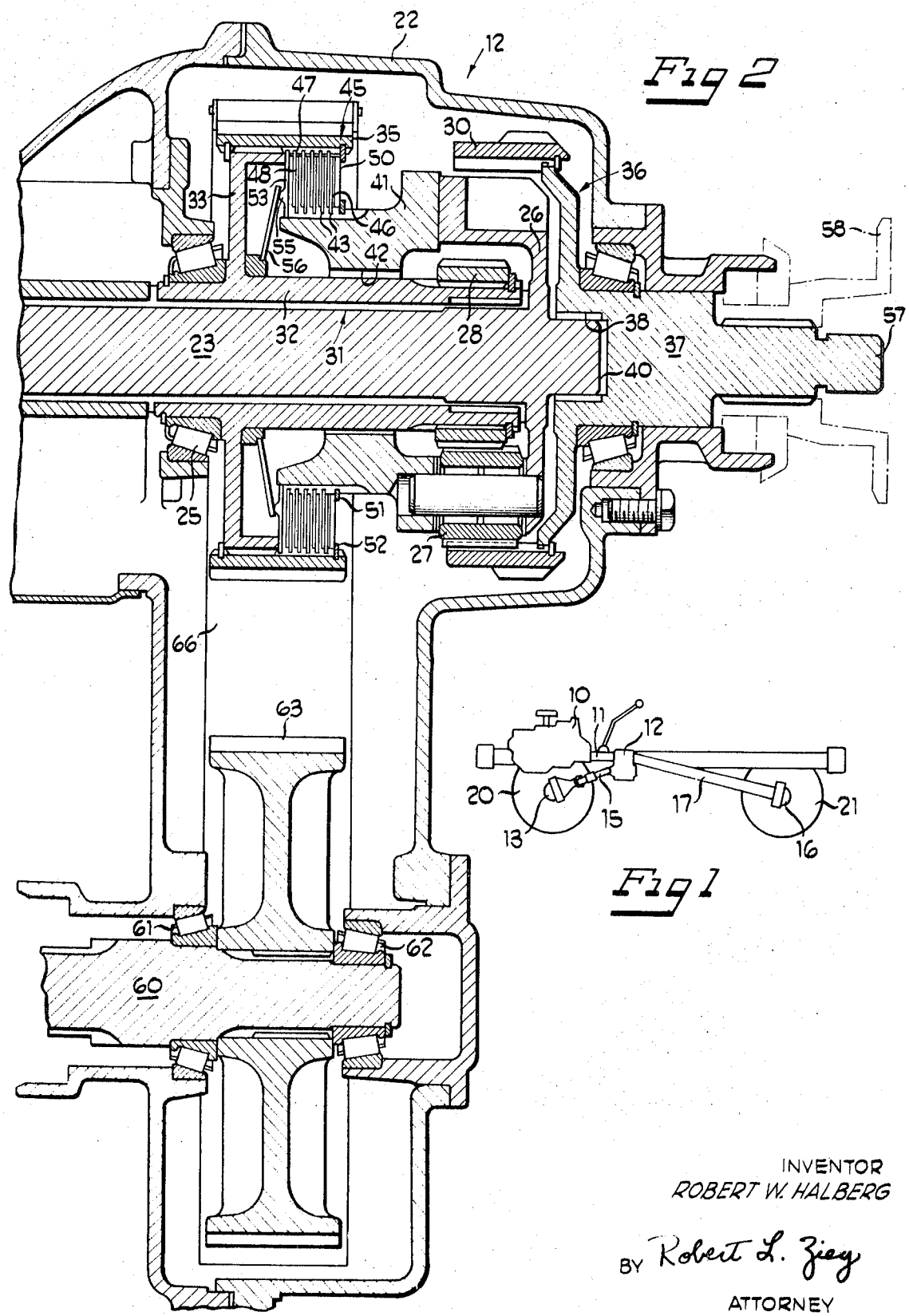
FIG. 1 is a perspective view of one embodiment of the present multiple path drive system shown schematically on an automotive vehicle.
FIG. 2 is an enlarged view partially in section of the torque transfer mechanism.

There is illustrated in FIG. 1, one type of automotive vehicle wherein the torque transfer mechanism of the present invention is particularly useful. The vehicle includes a prime mover 10 and a transmission 11 connected to the prime mover. A torque transfer mechanism 12 is connected to the transmission 11 and adapted to transmit torque to a front drive axle assembly 13 through a torque transmitting member here shown as a drive shaft 15 and a rear drive axle assembly 16 through a torque transmitting member here shown as a drive shaft 17. The front axle assembly 13 and rear axle assembly 16 are adapted to drive front and rear pairs of traction wheels 20 and 21 respectively.

Referring now to FIG. 2 in which one embodiment of the torque transfer mechanism 12 is shown, the torque transfer mechanism includes a housing generally referred to as 22. An input shaft 23 driven by the transmission 11 is shown journalled for rotation in the bearing 25 which is supported by the housing 22. Connected to the shaft 23 is a planetary carrier 26 which forms one element of a differential gear mechanism which is driven by the input shaft. The differential gear mechanism includes the planetary carrier 26, a plurality of planetary gears 27 on the carrier 26, a sun gear 28 positioned concentric to and overlying the input shaft 23, and a ring gear 30 also positioned concentric to the central axis of the input shaft 23. Another shaft 31 is positioned concentric to and overlying the input shaft 23 and consists of an axially extending sleeve portion 32 and a radially extending connector portion 33. The shaft 31 is adapted for rotation with respect to the input shaft 23 and the sun gear 28 is affixed to the shaft 33 of shaft 31 associated with a drive element 35 here shown as a spur gear in driving engagement therewith.

Attached to the ring gear 30 is a supporting member 36 consisting of a hub portion 37 having a central axis common to the input shaft 23. The hub portion 37 includes an axially oriented annular recess 38 which is adapted to overlie an end portion 40 of the input shaft 23 which shaft is journalled for rotation within said recess. Connected to the planetary carrier 26 is a supporting member 41 having an inner peripheral portion 42 which is supported on the sleeve portion 32 of the shaft 31 and adapted to slide axially with respect to said sleeve portion.

A friction clutch 45 is disposed between the supporting member 41 and the drive element 35. The clutch 45 includes a series of annular grooves 43 defined in the supporting member 41. Positioned in the grooves 43 are a series of friction discs 46. A similar series of grooves 47 are defined in a section of the drive element 35. A similar series of friction discs 48 are fixed in the grooves 47 in the rotary drive element 35 and, when assembled, are interleaved between the friction discs 46.

An annular ring 50 is supported between the rotary drive element 35 and supporting member 41 and is adapted to provide a support against axial movement of the pack of friction discs. The annular ring 50 is held against axial movement to the right as viewed in FIG. 2 by a pair of slip rings 51 and 52 which are fixed to the supporting member 41 and the rotary drive element 35 respectively. A second annular ring 53 is disposed between the rotary drive element 35 and the supporting member 41 and is adapted to slide axially with respect to both of these members. The annular ring 53 includes a projection 55 extending from it. Biasing means 56 here shown as a Belleville spring are positioned between the radially extending connector member 33 and the annular ring 53. The biasing means 56 are so constructed that when the device is assembled, the biasing means are somewhat compressed such that they exert a predetermined force adapted to urge the friction discs into a frictional engagement.

The ring gear supporting member 36 includes an axially extending shaft 57 projecting from the hub section 37. The shaft 57 is fitted with a coupling member 58 and is adapted to be connected to the rear drive shaft 17.

Disposed in the lower end of the casing 22 is an output shaft 60 which is journalled for rotation within a bearing 61 and 62 which are supported by the housing 22. Positioned on the output shaft 60 is a rotary driving element 63 here shown as a spur gear which is in splined engagement with the output shaft 60 and is connected for rotation therewith. A torque transmitting member 66 here shown as a chain driving element is shown connecting the rotary drive elements 35 and 63 for driving engagement. The output shaft 60 projects from the casing housing 22 and is adapted to be connected to the front drive shaft 15.

The operation of the four wheel drive system shown in FIGS. 1 and 2 and described herein is as follows.

An input torque is delivered to the torque transfer mechanism 12 through the input shaft 23. The input shaft 23 rotates the planet carrier 26 which through the planet gears 27 distributes torque between the sun gear 28 and the ring gear 30. The ring gear 30, through supporting member 36, shaft 57, and coupling 58 drive the drive shaft 17, the rear axle assembly 16 and ultimately the rear pair of traction wheels 21.

The sun gear 28 rotates the shaft 31, the rotary drive element 35 and, through the chain drive 66, the rotary drive element 63. The drive element 63 through its splined connection drives the output shaft 60, the front drive shaft 15, the front drive axle assembly 13 and ultimately the front pair of traction wheels 20.

Under normal straight ahead driving conditions the front and rear pairs of traction wheels will be rotating at the same speed and therefore, no tendency for differentiation will exist between the front and rear drive shafts and hence, no tendency for differentiation will occur between the planet carrier 26 and the sun gear 28. The planetary gear set will be rotating in a locked condition and the speed of the planet carrier and the friction discs 46 carried by the supporting element 41 will be the same as the speed of the rotary drive element 35 and the friction discs 48 carried by it. The biasing means 56 will urge the friction members into driving engagement and no slippage will occur.

If now, for instance, the vehicle encounters road conditions which would allow either the front or rear pair of traction wheels having greater tractive effort, with prior art devices all of the torque would be transmitted to the wheels having the least tractive effort. As a result of the biasing means 56 urging the friction members into a frictional driving engagement, a predetermined amount of torque will be transmitted through the clutch 45 to the pair of wheels having greater tractive effort. For instance, if the rear wheels tend to break loose and overspeed the front wheels, the planetary carrier 26 will transmit a predetermined amount of torque through the friction clutch 45 to the rotary drive element 35, the drive element 63 and the front pair of traction wheels 20 through the drive shaft 15. The same basic operation is true if the front wheels tend to overspeed the rear wheels.

If the vehicle encounters a curve or must negotiate a turn which requires that the front wheels overspeed the rear by virtue of the large arc through which they must travel, the force of the biasing means 56 urging the clutch 45 into engagement will be overcome and the speed difference will be taken up in the slipping of the friction elements with respect to each other rather than having the system locked up and taking the necessary slippage by scrubbing the tires. The predetermine biasing force would be engineered such that the friction clutch 45 would be allowed to slip when differentiation of this nature is desired. The same type slippage would be allowed to occur if the front and rear pairs of traction wheels differed in radius.

Thus, a multiple path drive system has been provided to allow differentiation through a slipping friction clutch when such differentiation is required but which will also serve to transmit a predetermined amount of torque under all conditions.

Various of the features of the invention have been particularly shown and described, however, it should be obvious to one skilled in the art that various modifications may be made therein without departing from the scope of the invention.

What is claimed is:

1. A multiple path drive system for a vehicle having at least two pairs of traction wheels including a plurality of drive axle assemblies; a plurality of torque transmitting members, each of said members connected to an axle assembly; a torque transfer mechanism comprising an input shaft having a central axis adapted to receive an input torque, a differential gear mechanism connected to said input shaft including an input element coaxial with said central axis and driven by said input shaft and a pair of output elements coaxial with said input shaft driven by said input element, said differential gear mechanism adapted to allow relative rotation between said input element and each of said output elements, an output shaft connected to one of said torque transmitting members laterally displaced from said input shaft, means adapted to connect one of said output elements to one of said torque transmitting members, means adapted to connect said other of said output elements to said output shaft, friction clutch means disposed between said input element and said output element connected to said output shaft and biasing means associated with said friction clutch means and adapted to urge said friction clutch means into an engaged condition thereby acting to resist relative rotation between said input element and said output element associated with said clutch means.

2. A multiple path drive system as in claim 1 in which said differential gear mechanism includes a planetary gear set said input element comprising a planetary carrier driven by said input shaft and a plurality of planet gears on said planet carrier, and said output elements comprising a ring gear and a sun gear meshing with said planet gears and driven by said planet carrier and the planet gears.

3. A multiple path drive system as in claim 1 in which said friction clutch means includes at least one friction surface associated with said input element and at least one friction surface associated with said one of said output elements, said biasing means adapted to urge said friction surfaces into engagement.

4. A multiple path drive system as in claim 1 in which said friction clutch means includes a plurality of friction surfaces attached to said one of said output elements and a plurality of friction surfaces attached to said input element, said biasing means adapted to urge said friction surfaces into driving engagement.

5. A multiple path drive system for a vehicle having at least two pairs of traction wheels including a plurality of axle assemblies; a plurality of torque transmitting members, each of said torque transmitting members connected to an axle assembly; a torque transfer mechanism comprising an input shaft adapted to receive an input torque, a planetary gear set driven by said input shaft including a planetary carrier connected to said input shaft, a plurality of planet gears on said planet carrier, a ring gear and a sun gear meshing with said planet gears and driven by said planet gears and said planetary carrier, said planetary gear set adapted to allow relative rotation between said planet carrier and each of said ring gear and sun gear, at least one friction surface connected to said planet carrier, at least one friction surface connected to said sun gear, biasing means urging said friction surfaces into engagement to resist relative rotation between said planet carrier and said sun gear, and means adapted to connect said ring gear and said sun gear to said torque transmitting members.

* * * * *